United States Patent [19]
Ziolko

[11] Patent Number: 4,549,330
[45] Date of Patent: Oct. 29, 1985

[54] APPARATUS FOR PREPARING SAUSAGE LINKS

[75] Inventor: Francis J. Ziolko, Bridgewater, N.J.

[73] Assignee: Devro, Inc., Somerville, N.J.

[21] Appl. No.: 537,763

[22] Filed: Sep. 30, 1983

[51] Int. Cl.⁴ .................. A22C 11/00; A22C 11/10
[52] U.S. Cl. ............................................ 17/34; 17/1 F
[58] Field of Search ............................ 17/1 F, 34, 49

[56] References Cited
U.S. PATENT DOCUMENTS

| | | | |
|---|---|---|---|
| 1,033,154 | 7/1912 | Collins | 17/34 |
| 1,442,232 | 1/1923 | Neuberth | 17/34 |
| 1,629,655 | 5/1927 | Curry | 17/34 |

Primary Examiner—Willie G. Abercrombie
Attorney, Agent, or Firm—Michael Q. Tatlow

[57] ABSTRACT

An apparatus to make sausage links is disclosed. The apparatus employs a series of spaced apart forming arms to make the link end of the sausage. The length of the link is generally determined by the straight line distance between adjacent forming arms. The length of the sausage line to be made can be adjusted by moving the mid-portion of the link with a link length adjuster to increase the length of the stuffed casing between adjacent forming arms.

7 Claims, 8 Drawing Figures

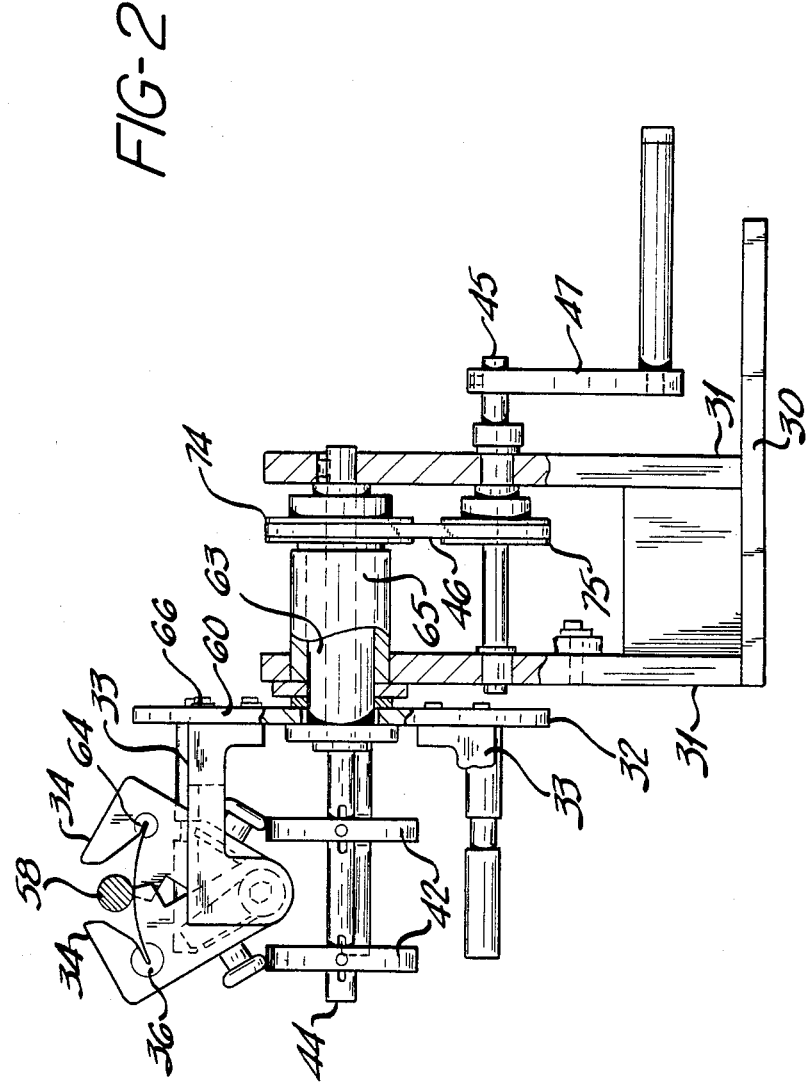

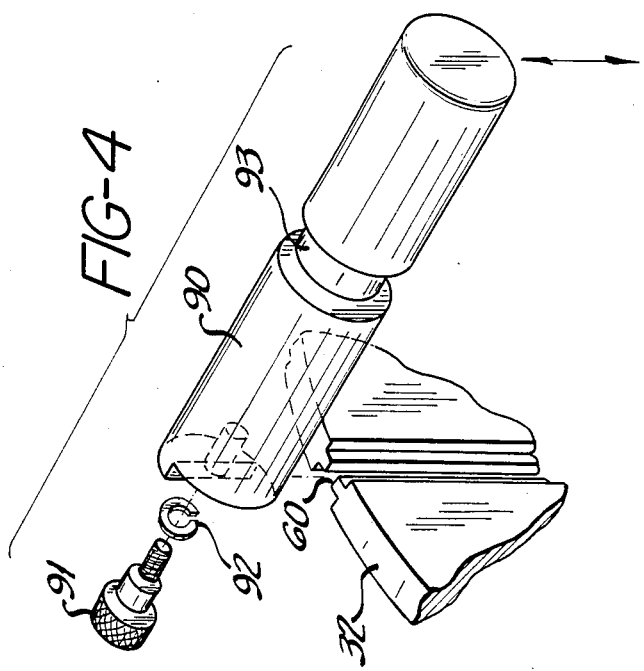
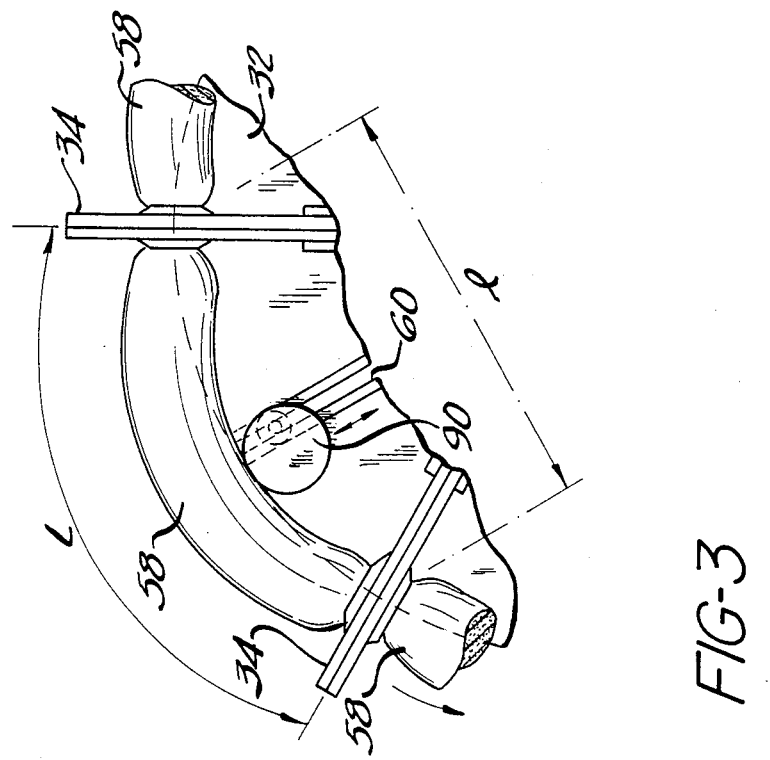

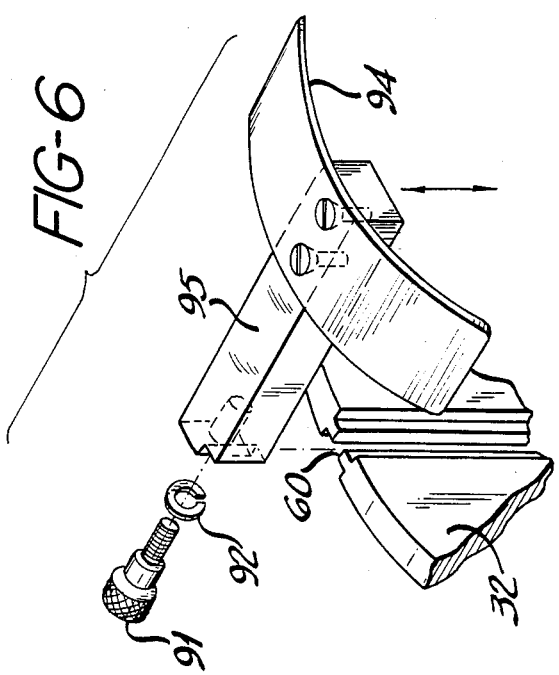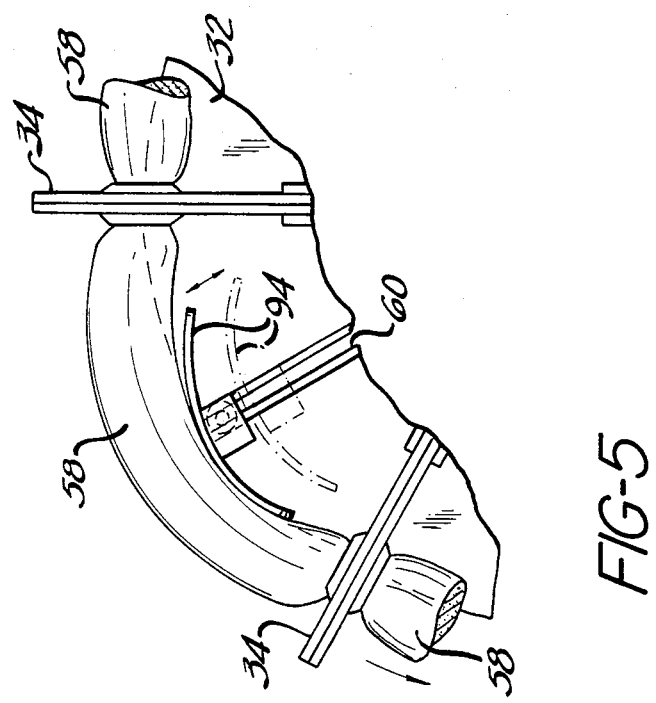

APPARATUS FOR PREPARING SAUSAGE LINKS

BACKGROUND OF THE INVENTION

1. The Field of the Invention

The present invention relates to an apparatus to form individual sausage links or a chain of connected links from a sausage casing stuffed with a meat emulsion. The present apparatus provides an adjustment mechanism to readily control the length of the sausage link.

2. Prior Art

This invention is an improvement to the apparatus disclosed in U.S. patent application Ser. No. 279,895 filed July 2, 1981, now U.S. Pat. No. 4,418,447 the disclosure of which application is incorporated herein by reference. Apparatus to form individual sausage links from a casing stuffed with a meat or other food emulsion have been in use for some time. These machines normally form the individual links by a twisting process in which a portion of the filled casing is pinched at intervals along its length and the casing is twisted. As the casing is twisted, the meat emulsion or other filling material in the casing is forced away from the twisted portion of the casing to form the individual link. The above-mentioned application discloses an apparatus in which the link is formed without any twisting of the casing. The stuffed casing is contacted at spaced points along its length by forming arms which close onto the casing to force the meat emulsion away from the point of contact and form a link end in this manner. The apparatus consists of a series of forming arms which are mounted on a mounting plate or chain and capable of moving in an endless or continuous cycle. The distance between adjacent forming arms determines the length of the link to be made by the apparatus. In the preferred form of the apparatus, the forming arms are mounted on a circular plate or disc and the length of the link to be made can be adjusted by moving the forming arms inward or outward along the radius of the disc.

The forming arms are open and closed by a cam mechanism which is connected to the forming arms through a cam follower attached to the forming arms. When it is desired to change the length of the sausage to be made by the apparatus, it is necessary to move the forming arms radially inward or outward on the mounting disc or plate and also to change the cam that is used to actuate the forming arms. Adjustment of the length of the link is important to the sausage producer since the sausage producer sells the finished product by weight and it is necessary that a given weight of sausage be made up of a number of whole links, as fractional or part links are not accepted by consumers. If the sausage linking machine cannot be adjusted to give the proper weight for a link, a sausage producer may have to use larger or smaller diameter sausage casings to obtain the correct weight. A change in the diameter of the casing interrupts the production of the casing stuffing machines and wastes product which has been stuffed into casings of the improper diameter. Although the above-mentioned apparatus is capable of adjusting the link length, such adjustment can be time consuming since it requires that not only the movement of the individual forming arms but also the replacement of the cam in the apparatus.

SUMMARY OF THE INVENTION

The present invention provides an alternate mechanism to change the length of the link produced on the apparatus. This alternate system provides a finer adjustment variation in link length without the necessity of changing the cams on the apparatus or moving the forming arms. The present apparatus provides a link length adjusting means in the form of an adjuster which can deflect the sausage casing radially outward between adjacent forming arms in the apparatus. This changes the length of the casing between adjacent forming arms and, thereby, changes the length of the sausage link produced on the apparatus. The advantage of the present apparatus is that it does not require the removal of cams or forming arms to make minor variations in the length of the sausage link produced.

BRIEF DESCRIPTION OF THE DRAWINGS

FIG. 2 is an end view of the apparatus of the present invention partially in cross section.

FIG. 3 is a sectional view of the mounting plate of the present invention showing a link length adjuster position to change the length of the link.

FIG. 4 is an exploded view of one form of link length adjuster showing how it is attached to the apparatus.

FIG. 5 shows another form of link length adjuster of the present invention.

FIG. 6 shows the details of one form of attachment mechanism to attach the link length adjuster of FIG. 5 to a mounting plate in the present apparatus.

DETAILED DESCRIPTION OF THE INVENTION

Figure 1:
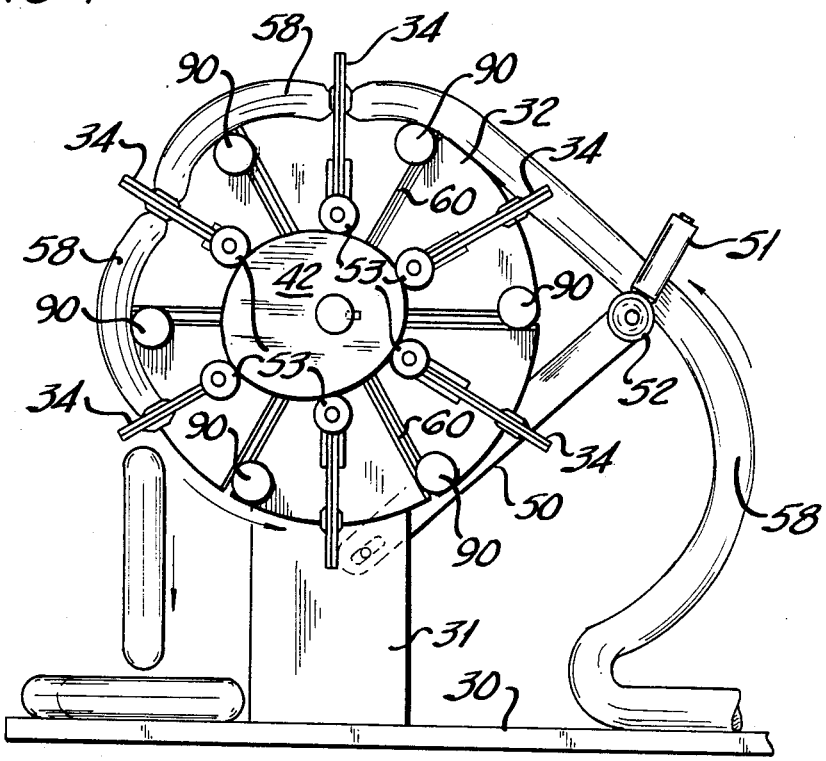
FIG. 1 is a side elevation view of the apparatus of the present invention.

As depicted in FIG. 1 and FIG. 2, the apparatus of the present invention has a base 30 upon which are mounted vertical supports 31. Attached to the supports 31 is a mounting means in the form of a circular plate or disc 32. Attached to the disc there are a series of mounting brackets 33. There is a pair of forming arms 34 attached to each of the mounting brackets. The mounting brackets are attached to the disc 32 in a radially extending slot 60 and are secured to the mounting disc by bolts 66, as shown in FIG. 2. The mounting plate is capable of moving around the stationary shaft 44 on which there are mounted a pair of cams 42. The cams are fixed to the shaft. As the mounting plate carrying the forming arms is rotated around the fixed shaft, the cams will force the forming arms toward one another to form a link end of the sausage.

In place of the circular disc 32, the forming arms may be mounted on endless chains. The chains would be mounted on a support which would include surfaces to move the cam followers to open and close the forming arms in a cyclic manner.

Stuffed sausage casing 58 is fed into an open pair of forming arms passing between a pair of vertical roller guides 51 (one of which is shown in FIG. 1) and over a horizontal roller guide 52 which is mounted to one of the vertical supports 31 through a casing support arm 50. As the mounting plate is rotated by hand or through a motor-driven mechanism (not shown), a pair of the forming arms will open or close according to the high and low points on the cams 42. The sausage casing is fed into an open pair of forming arms, and as the forming arms are carried around the center line of the machine, which is through stationary shaft 44, the cams 42 force the forming arms together forming individual sausage links.

The driving mechanism to rotate the mounting plate is shown in FIG. 2. The mounting plate 32 is keyed into a collar 63 which is mounted on free turning bearings on the shaft 44. The shaft 44 is mounted on the supports 31 so that the shaft is fixed and the collar 63 is capable of rotating around the shaft. There is a chain or belt 46 arttached to the collar through a suitable sprocket 74, and the chain or belt is also attached to a sprocket 75 attached to a rotating shaft 45. There is a crank 47 affixed to the shaft 45 and, upon rotation of the crank 47, the collar 63 is rotated by the belt 46 to turn the mounting plate 32 in a continuous or endless motion. There is a stationary safety cover 65 over the collar 63 to prevent accidental contact of the rotating collar by a worker.

Although the apparatus is shown in FIG. 1 as having a hand-operated crank, it should be understood that it is possible to add electric motors to turn shaft 45 rather than having the device hand-operated.

Figure 7:
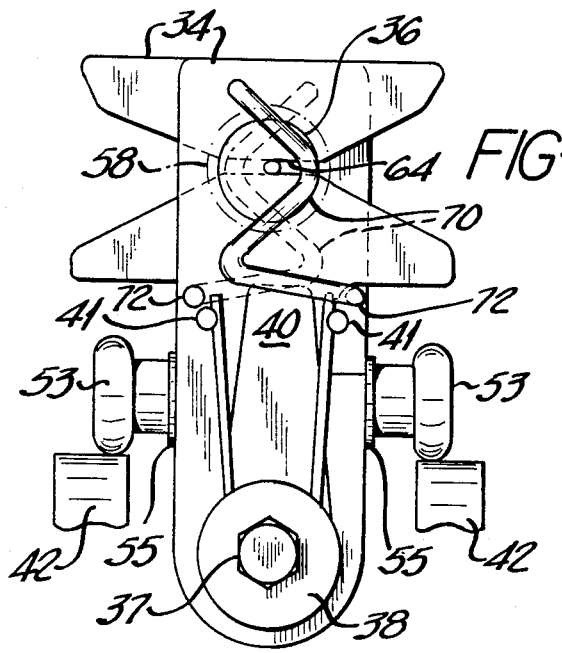
FIG. 7 is a detail view of a pair of forming arms in a closed position.

There are a series of support brackets 33 affixed to the mounting plate 32. One end of these brackets is affixed in a slot 60 by bolts 66 in the mounting plate in such a fashion that they may be moved along the radius of the mounting plate. Attached to the other end of each bracket is a pair of forming arms 34. It should be understood that the number of pairs of forming arms that can be attached to a mounting plate depends on the diameter of the mounting plate and the desired distance between adjacent pairs of forming arms. The distance between adjacent pairs of forming arms will generally determine the length of the link to be made by the apparatus. By moving the support brackets radially outward on the mounting plate, it is possible to adjust the length of the link to be made. Moving the brackets radially outward on the mounting plate will increase the length of the link, as it will increase the respective distance between adjacent pairs of forming arms. Conversely, moving the support brackets radially inward on the mounting plate will reduce the length of the sausage link to be made. If sausage links of a significantly different length are to be made, the cams 42, which are keyed to the shaft 44, must also be changed to insert larger or smaller cams, depending on whether longer or shorter sausage links are desired. Each of the forming arms 34 is made of relatively thin metal or plastic. The forming arms have an opening which is preferably V-shaped, as best shown in FIGS. 2 and 7. The particular shape of the opening is not critical. A V-shaped opening is shown in the drawings, but the opening may be semicircular, semielliptical or another geometric configuration. The opening in a forming arm must face the corresponding opening in the other forming arm in the same forming arm pair to allow the stuffed casing to be fed between the open forming arms. In the preferred form of the apparatus, the openings in the forming arms have the same shape or configuration. However, it is possible for the openings in a pair of arms to be of a different shape or to have an opening in only one of the forming arms in a pair. The other forming arm in a pair would have a flat surface on the edge of the arm facing the opening. The link end is formed by the casing being forced into the opening in the one forming arm by the flat surface of the other forming arm.

The assembly of each pair of forming arms is best shown in FIG. 7. The forming and cutting arms are attached to a mounting bracket 33 by means of a bolt 37 or other suitable fastener. Each of the forming arms has a cam follower wheel 53 attached to the arm by means of a cam follower pin. The cam follower wheel is attached so that it is capable of rotating freely around the cam follower pin. In order to obtain this rotation, it is preferable to fix a plastic washer 55 between the cam follower wheel and the forming arm. The inner forming arm, that is the forming arm closest to the bracket, is attached to the bracket 33 so that it is flush with the bracket. Adjacent the outer or other forming arm is a pressure plate 40 which will force the outer forming arm against the inner forming arm. A spring 39 is coiled in such a fashion that a bushing 38 may pass through the coil. The ends of the spring are bent over pins 41 which tends to force the forming arms apart. A slot may be cut into the pin 41 to receive the end of the spring and hold it securely. This is best shown in FIG. 7. When the forming arms are in the fully opened position, the lower surfaces 61 of the arms co-act in such a way as to form a relatively flat surface to receive the stuffed casing as it is introduced into the machine. This is best shown in FIG. 2.

As the mounting plate attached to collar 63 is rotated, the cam followers 53 will open or close the forming arms, depending on the high and low surfaces on the actuator cams 42. FIG. 2 shows the opening formed between the forming arms in a fully open position, and FIG. 7 shows the forming arms in a position immediately before they are fully closed.

Figure 8:
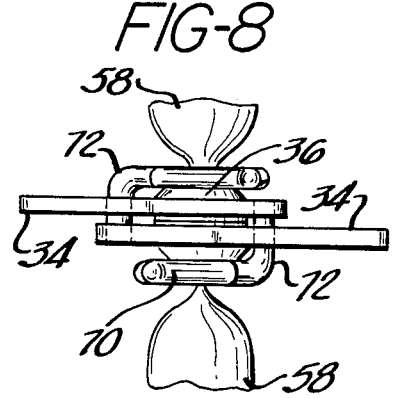
FIG. 8 is a top view of the pair of forming arms shown in FIG. 7.

There is a slot 64, which is relatively narrow, formed at the closed end of the opening in at least one of the forming arms in each pair. The presence of the slot 64 prevents excessive pressure on the casing when the meat emulsion is being squeezed out of the casing by the forming arms. The empty casing can move out of the V-notch of the forming arms and into the slot 64 at the apex of the V-notch. At the end of the slot, there is a cutting surface (not shown) which is capable of interacting with the corresponding cutting surface on the other forming arm in a given pair to cut the sausage casing at the appropriate point in the cycle. The cutting surface is cut at an angle of from about 10° to 45°. The cutting action is a scissors-type action. The preferred method of forming the slot and the cutting surface is with a replaceable insert 36, which is shown in FIG. 8. The cutting surface at the end of the slot may be eliminated if it is desired to form a string or chain of connected sausage links. The thickness of the insert is greater than the thickness of the forming arm into which the insert is placed. The outer surface, that is the surface away from the cutting edge of the insert, has a truncated, conical portion which is thickner than the portion of the insert that is fitted into the forming arm. The purpose of the truncated, conical portion is to aid in pushing the filling within the casing in a longitudinal direction away from the cutting blade as the forming arms are moved toward each other, as will be explained below.

To assist in the positioning of the casing in the center area of the forming and cutting arms, stabilizers 70 may be attached to the arms. The stabilizers prevent the filled casing from moving out of alignment with the slot 64 and the cutting surfaces as the forming arms are closing. They also assist in pushing the filling material within the casing in a longitudinal direction away from the insert. This gathers more casing into the slot and improves the physical appearance of the end of the link. As shown in FIGS. 7 and 8, the stabilizers have a portion 72 attached generally perpendicular to the side of the forming arm. The perpendicular portion 72 is of sufficient length to clear the thickness of the other forming arm in the pair. The stabilizer in one forming arm acts in conjunction with the opening of the other forming arm of the same pair to align the casing into the slot 64 and into contact with the cutting surfaces.

In order to provide the capability of adjusting the length of the link to be made without changing the cams and the position of the forming arms, there is provided a link length adjuster 90 mounted on the face of the mounting plate between each pair of forming arms. The link length adjuster functions by bending the sausage link as it is formed, as shown in FIG. 3. The link is, therefore, longer than the straight line distance between adjacent pairs of forming arms. The adjuster is preferably mounted in a slot 60, as shown in FIG. 4 of the drawings. The adjuster shown in FIG. 4 is a cylinder which is mounted in the slot by a bolt 91 which is held in position by a lock washer 92. The cylinder may be made of metal or plastic and may be one to two inches in diameter. There is a depression 93 in the cylinder which provides clearance for the inner cam in the event that the adjusters are positioned close to the cam 42. The adjusters are capable of making an adjustment to the length of the link without the necessity of changing the cam. For a sausage link which is approximately $3\frac{7}{8}''$ in length, the deflector could change the length of the link to approximately $4\frac{1}{4}''$. This would be done by setting the straight line distance between forming arms at $3\frac{7}{8}''$. By moving the adjuster radially outward on the mounting plate, an acceptable appearing and shaped sausage link of approximately $4\frac{1}{4}''$ could be manufactured without moving the cam. This capability provides a significant advantage as it allows the sausage manufacturer to readily adjust the length of the sausage without the necessity of changing the cam.

An alternative form of link length adjuster is shown in FIGS. 5 and 6. This adjuster is an arcuate shoe 94, mounted on a support 95 and affixed into the slot 60 on the mounting plate. A shoe of this type is advantageously used when the sausage link is relatively large sized, such as 6 or 8 inches, as it provides greater support for the sausage link and prevents bending the center of the link. The apparatus of the present invention can make sausage links of this length by having a very large diameter mounting plate or by eliminating alternate forming arms on a smaller diameter mounting plate.

The preferred method of attachment of the link length adjusters in the apparatus is in slots in the mounting plate as described above. The adjusters could also be attached to a mounting bracket by means of a moving arm.

OPERATION TO FORM SEVERED LINKS

The operation of the apparatus to form the severed links is as follows. The previously stuffed sausage casing 58 is fed over the guide rollers 51 and 52 into an open pair of forming arms as is shown in FIGS. 1 and 2. The casing will rest on the lower portions of the overlapping forming arms. As the mounting plate is rotated, the forming arms will contact the sausage casing and pull additional casing into the apparatus. As the mounting plate rotates, the forming arms gradually close, forming a sausage link end. In the event it is determined that the length of the link is too short, that is, the number of links necessary to result in a given weight of sausage is too large or an amount indivisible by a whole number, it is possible to move the adjusters 90 or 95 to vary the length of the link made by the apparatus. This can be done by simply loosening the bolt 91 and moving the adjuster radially outwardly on the mounting plate. The movement of the adjuster radially outward on the mounting plate increases the length of casing between two adjacent forming arms and the length of sausage link.

I claim:

1. In an apparatus for forming sausage links from a stuffed casing, said apparatus including a plurality of pairs of forming arms mounted on a mounting means capable of moving in a continuous cycle, means to direct a stuffed casing into an open pair of forming arms, said forming arms being movable from an open position to a closed position to form a link end, and in which the distance between adjacent forming arms determines the minimum length of the sausage link, the improvement comprising an additional link length adjusting means positioned between adjacent forming arms to change the length of the stuffed casing between said adjacent pairs of forming arms, thereby, changing the length of the formed sausage link.

2. The apparatus of claim 1 in which the link length adjusting means is a cylinder movably affixed to said mounting means.

3. The apparatus of claim 1 in which the link length adjusting means is an arcuate shoe movably affixed to said mounting means.

4. The apparatus of claim 2 in which the mounting means is a circular disc and the cylinder is movably mounted in a slot positioned on the radius of said disc.

5. The apparatus of claim 3 in which the mounting means is a circular disc and the arcuate shoe is mounted in a slot positioned on the radius of said disc.

6. In an apparatus for forming individual sausage links from a stuffed casing, said apparatus including a plurality of pairs of forming arms affixed at spaced points on a mounting disc which is capable of moving in a continuous cycle, said pairs of forming arms being movable from an open position to receive a stuffed casing to a closed position to form a link end, and in which the distance between adjacent forming arms determines the minimum length of the sausage link, the improvement comprising a link length adjustment means movable from a position below a straight line between adjacent forming arms to a position above said straight line to increase the length of stuffed casing between adjacent forming arms.

7. The apparatus of claim 6 in which the link length adjusting means is a cylinder affixed perpendicularly to the face of the disc and movably mounted in a slot which is positioned on the radius of said disc.

* * * * *